Feb. 22, 1938.   H. H. KERR, JR   2,109,114
HYDRAULIC BOWDEN CONTROL
Filed March 18, 1933   6 Sheets-Sheet 5
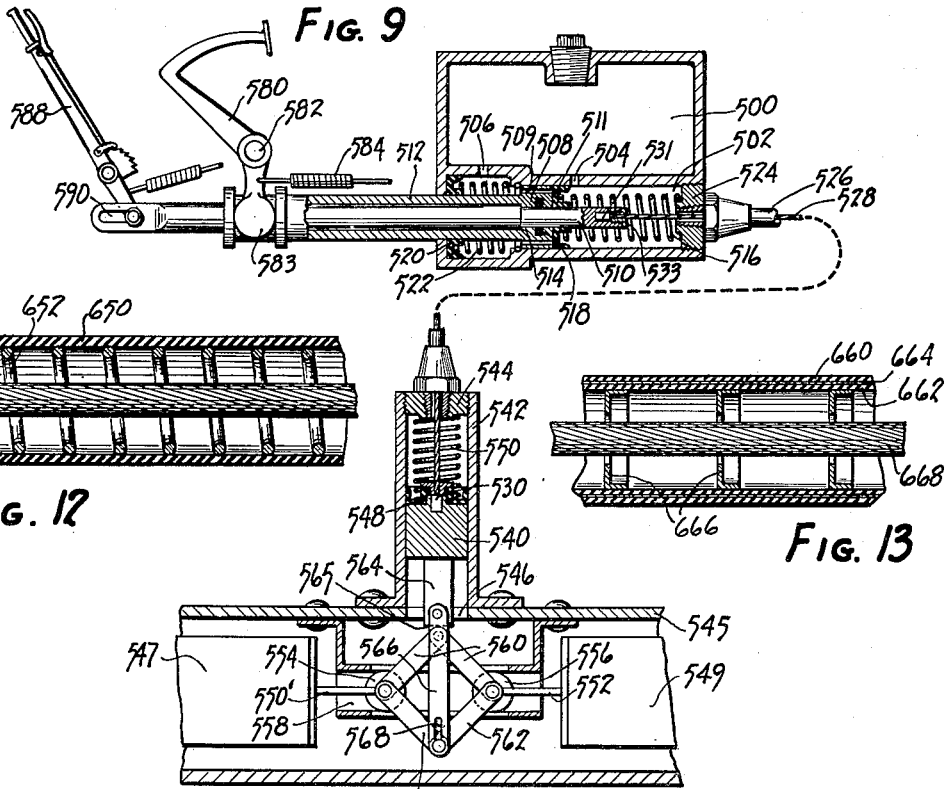
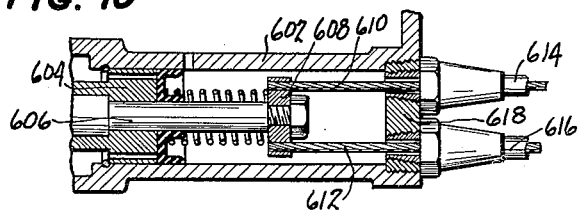
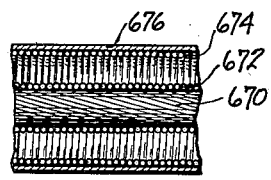
INVENTOR.
Henry H. Kerr, Jr.
BY
ATTORNEY.

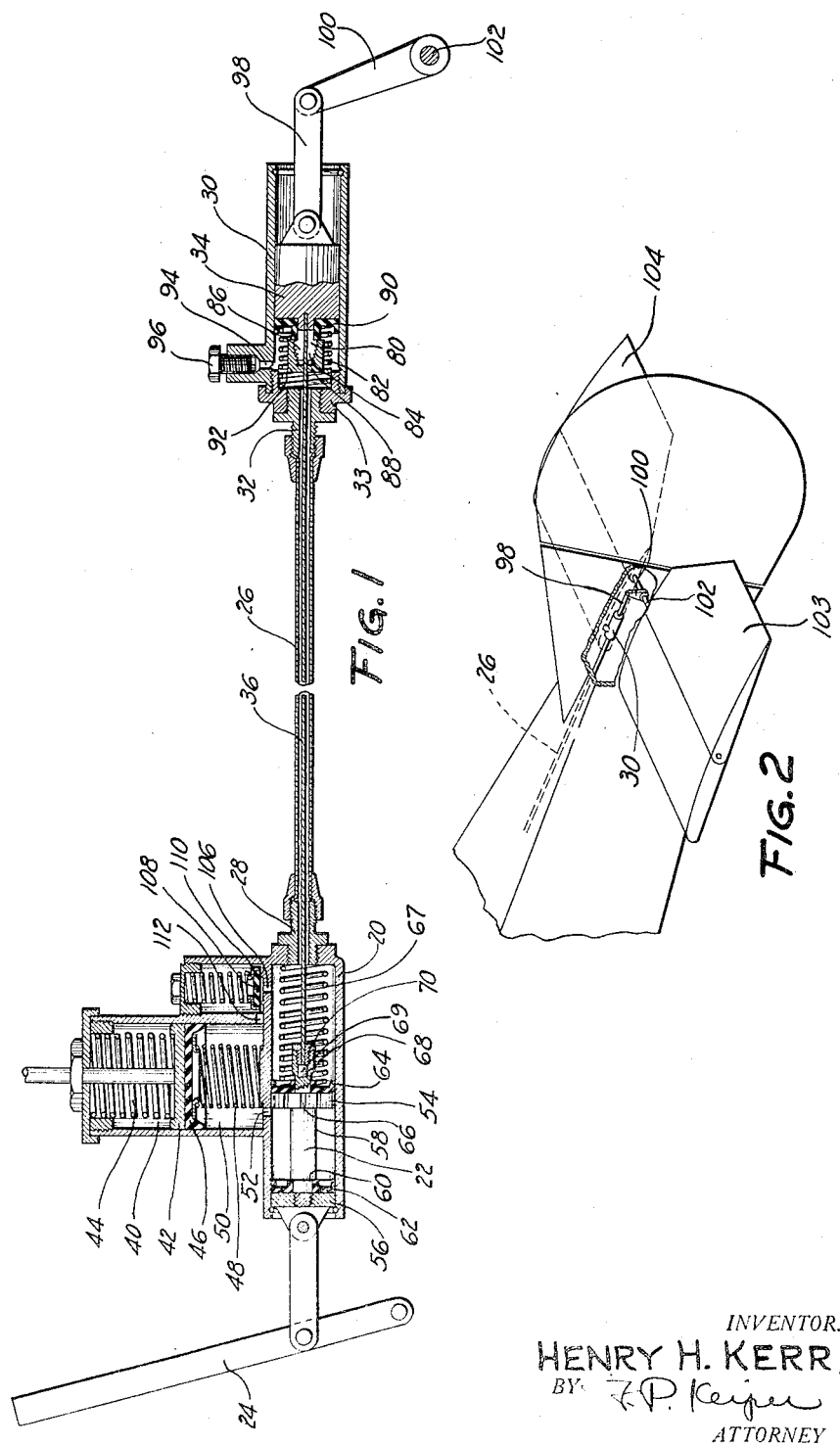

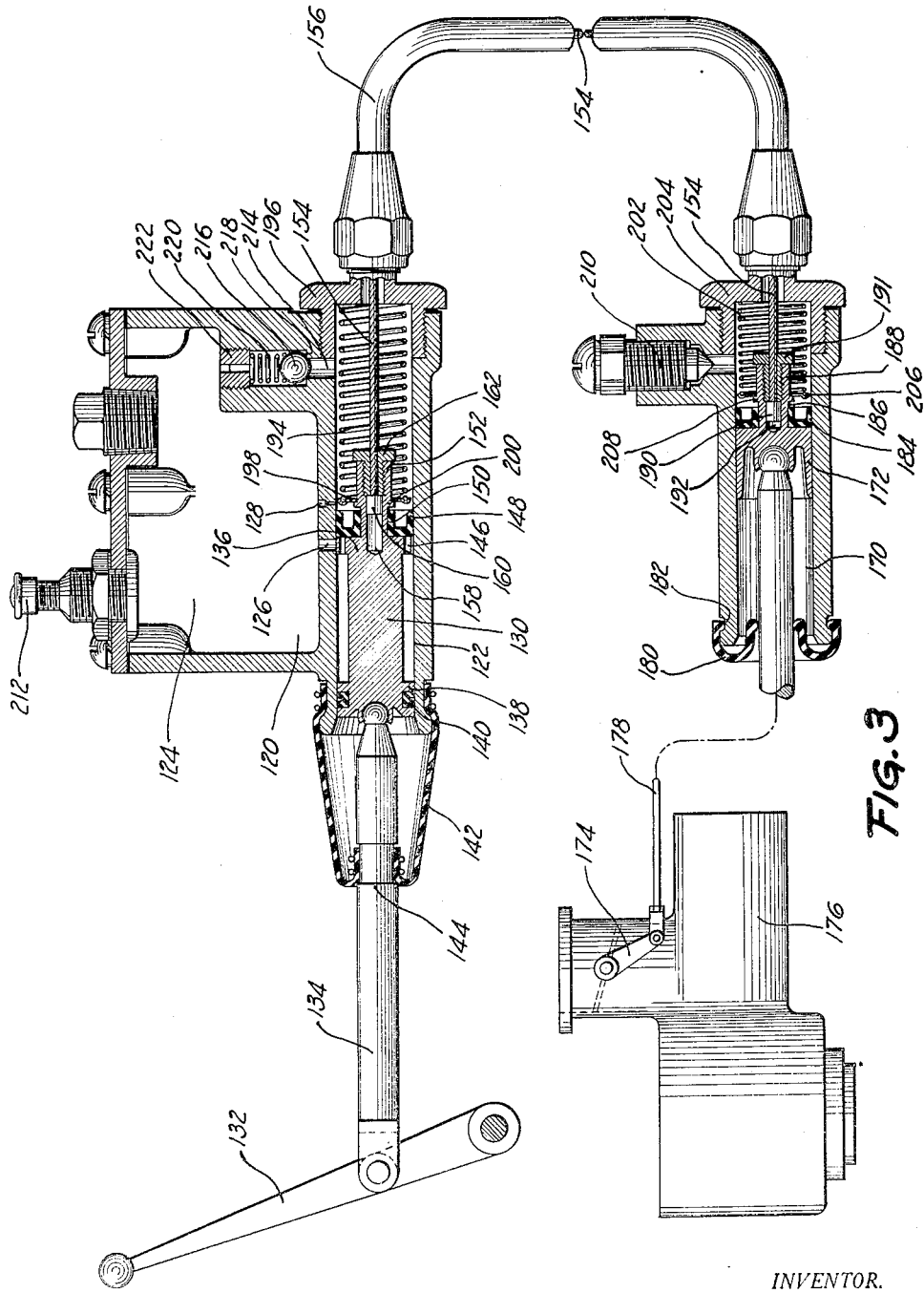

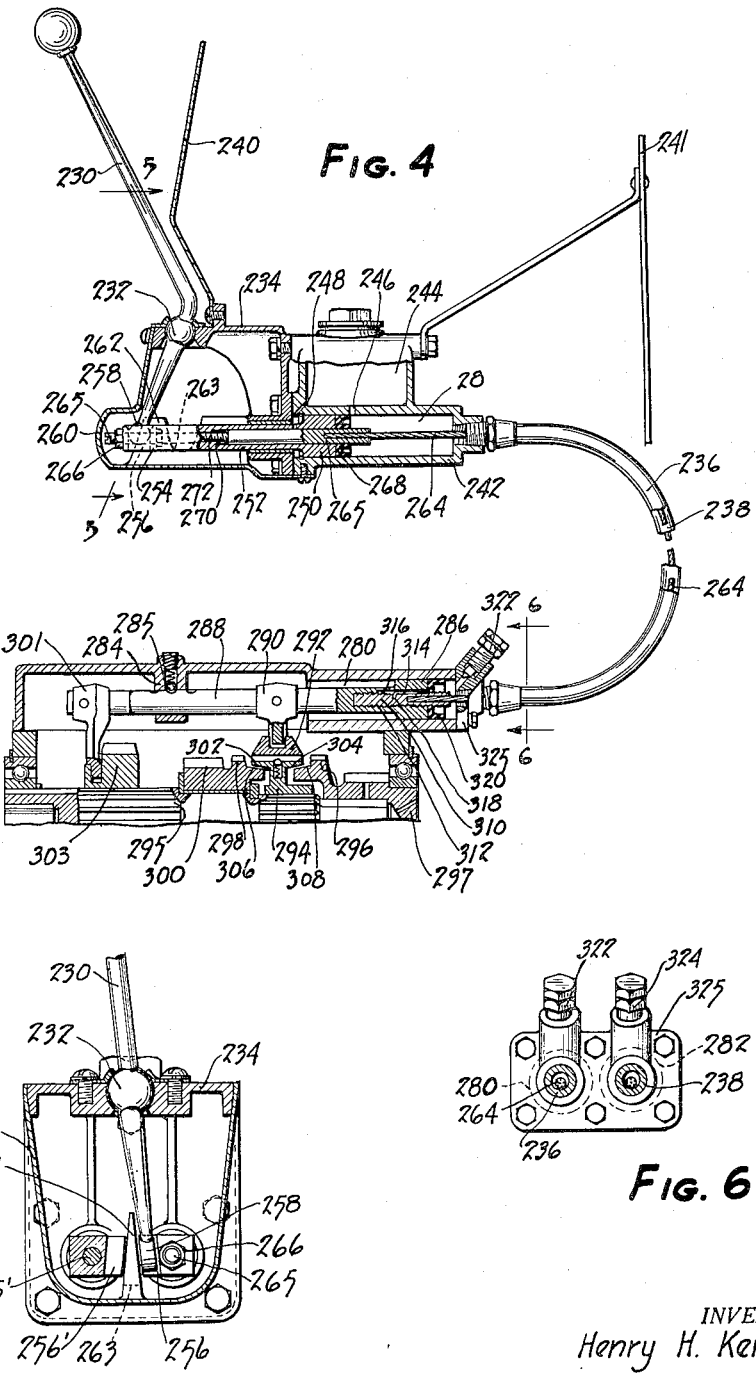

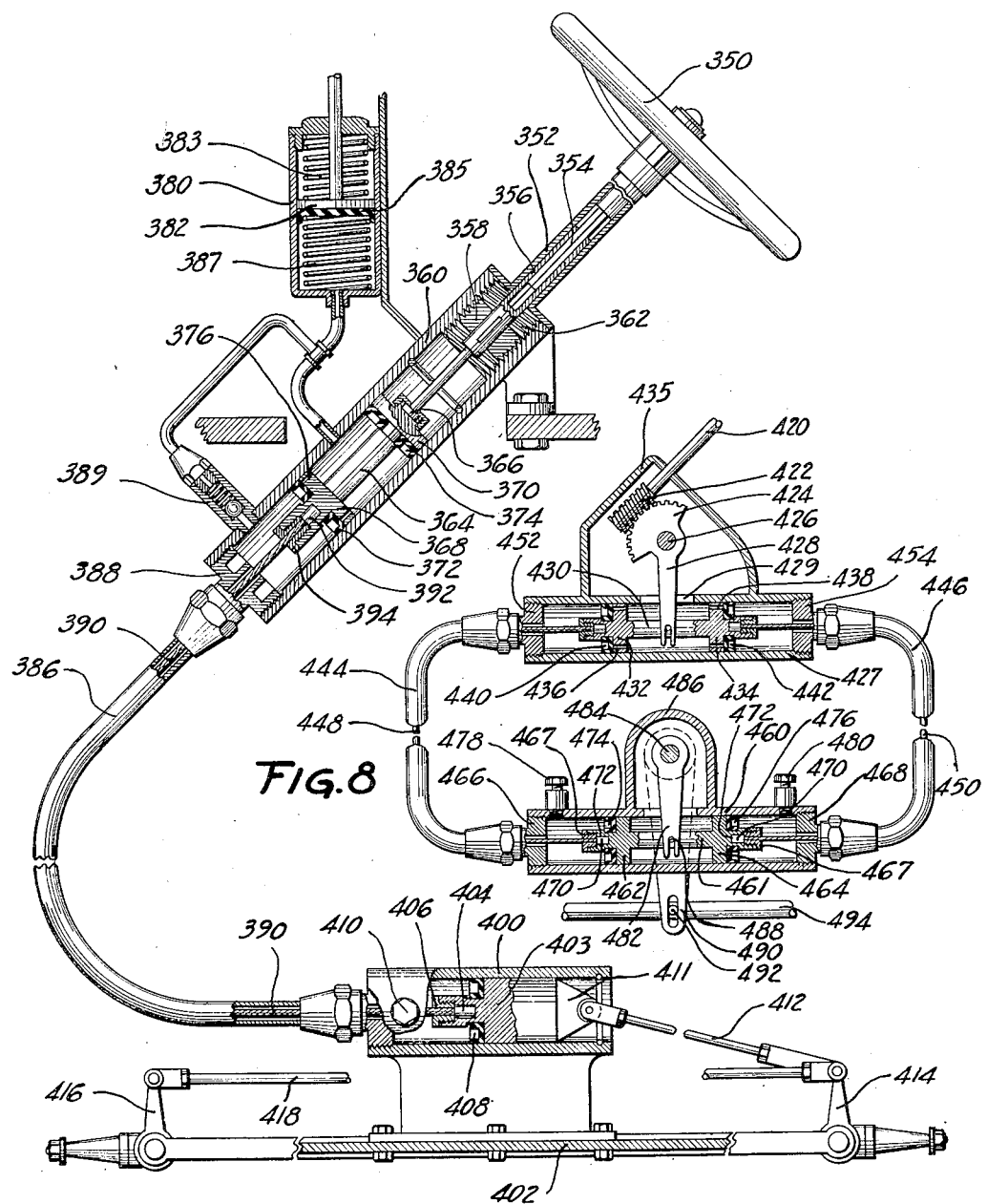

Feb. 22, 1938. H. H. KERR, JR 2,109,114
HYDRAULIC BOWDEN CONTROL
Filed March 18, 1933 6 Sheets-Sheet 6
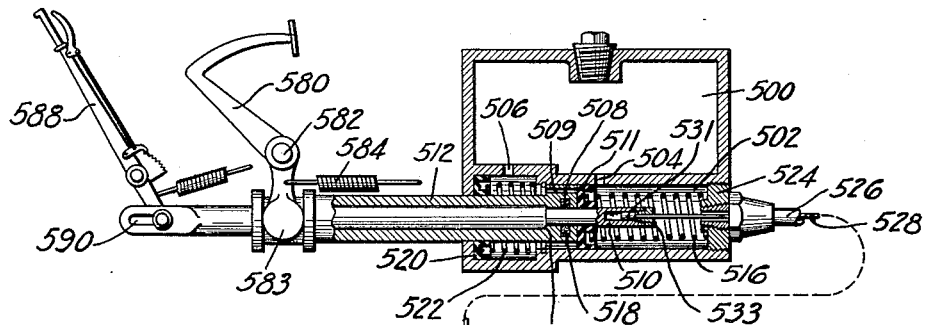
FIG.15
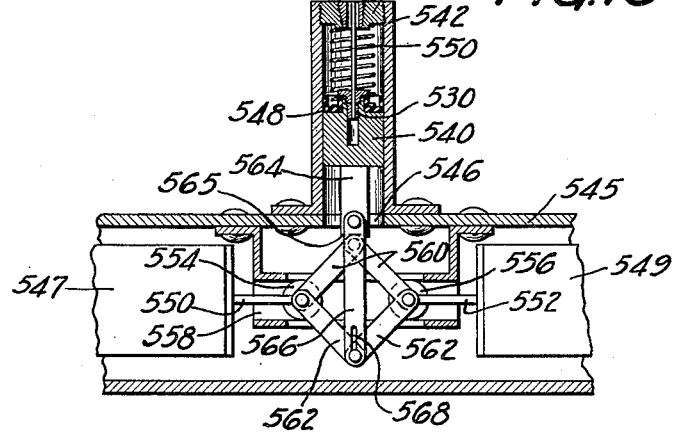
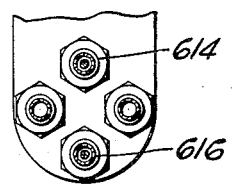
FIG.16  FIG.17
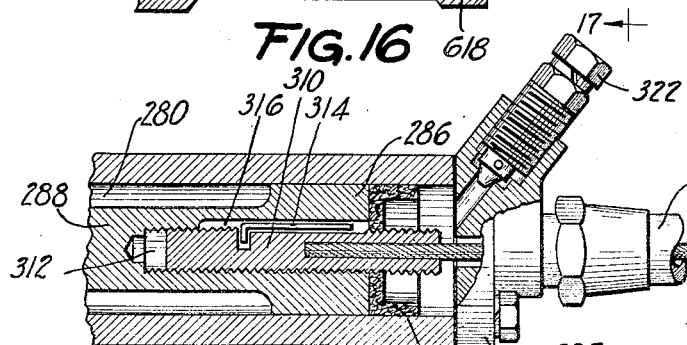
FIG.18
INVENTOR.
Henry H. Kerr
BY
ATTORNEY Patented Feb. 22, 1938

2,109,114

UNITED STATES PATENT OFFICE 2,109,114

HYDRAULIC BOWDEN CONTROL

Henry H. Kerr, Jr., South Bend, Ind., assignor to Bendix Aviation Corporation, South Bend, Ind., a corporation of Delaware Application March 18, 1933, Serial No. 661,617

8 Claims. (Cl. 60—54.5)

This invention relates to a control system and more particularly to a hydraulic-mechanical double acting remote control apparatus suitable for use in operating, for example, the various remote controls of aircraft, land vehicles, or marine engines.

The invention involves primarily a hydraulic conduit connecting a master cylinder with an operating cylinder, each of which cylinders are equipped with pistons of such diameter as to have uniform linear movements for equal piston displacements in the operating and master cylinders, and a flexible tension cable carried in the conduit, and secured at its ends to the master piston and operating piston respectively. By such an arrangement, hydraulic means are used for driving the operating piston outwardly in its cylinder, while a flexible cable lying in the hydraulic conduit is adapted to pull the operating piston inwardly, thus causing the operating and master pistons to follow each other's motion in a substantially positive and exact manner, and with great efficiency.

It is accordingly an object of this invention to provide a novel control system combining hydraulic and mechanical control means combined in a single conduit in an efficient manner.

Another object of the invention is to provide a novel control system having a hydraulic conduit, a flexible tension cable therein, and master and operating cylinders and pistons at either end adapted to operate in one direction by hydraulic fluid compression, and in the opposite direction by tension of the flexible cable.

Still another object of the invention is to provide, in a novel control system of the type suggested, means whereby the tension cable may be maintained constantly in tension so that movements of the master and operating pistons may be substantially identical.

A further object of the invention is to provide novel hydraulic conduit structures adapted to slidably carry therein a flexible tension cable.

A still further object of the invention is to provide a novel hydraulic braking system wherein a separate and distinct means employing the hydraulic distribution conduits is available for operating the brake independently of hydraulic actuation thereby increasing the safety of a hydraulic braking system.

Yet another object of the invention is to provide a novel control system, of the type suggested, in a steering mechanism for automotive vehicles, wherein resides safety and accurate control of steering insensitive to and independent of axle roll and other movements due to the spring suspension of the dirigible wheels.

Further objects of the invention have to do with novel combinations of the hydraulic-mechanical control in connection with various aviation, and automotive vehicle controls.

The aforesaid objects and other novel features of the invention will appear more fully hereinafter from the following detailed description when taken in conjunction with the accompanying drawings. It is understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 1 is a view in section illustrating a form of the invention wherein the hydraulic liquid is maintained under pressure;

Figure 2 is a view in section illustrating the tail of an airplane showing adaptation of the control mechanism to the elevator planes.

Figure 3 is a view in section illustrating another form of control mechanism operating under atmospheric pressure, by way of example, shown as a control for a carburetor throttle.

Figure 4 is a view in section illustrating a manner of employing the control mechanism for the purpose of gear shifting;

Figure 5 is a section taken on the line 5—5 of Figure 4;

Figure 6 is a section taken on the line 6—6 of Figure 4, showing an end view of the operating cylinder and guide rod housing;

Figure 7 is a diagrammatic illustration of the invention applied to an automotive vehicle steering apparatus;

Figure 8 is a modified form of Figure 7 wherein the elements are duplicated for safety;

Figure 9 is an illustration of a novel application of the control apparatus to a vehicle brake;

Figure 10 is a view in section illustrating a modified form of master cylinder over that of Figure 9 adapted to operate two or more brakes;

Figure 11 is a view in section illustrating the manner in which a bellows may be employed in the various modifications;

Figure 12 is a longitudinal section of a form of hydraulic conduit and cable;

Figure 13 is a longitudinal section of another form of hydraulic conduit and cable;

Figure 14 is a further modified form of hydraulic conduit and cable.

Figure 15 is a view similar to Figure 9 showing a modification wherein axially slidable core pieces are employed in the master and operator pistons;

Figure 16 is a view similar to Figure 10 showing a modified form of master cylinder;

Figure 17 is a view taken on the line 17—17 of Figure 16; and

Figure 18 is an enlarged sectional view showing a portion of the device illustrated in Figure 4.

Referring to Figure 1, there is shown therein a master cylinder 20 having a piston 22 adapted to be actuated by a common joy stick or master control lever 24 of an aircraft. At one end of the master cylinder 20 is secured a hydraulic conduit 26 by means of a suitable fitting 28, which conduit extends to an operating cylinder 30 and is secured thereto by suitable fittings 32 and 33, the latter of which preferably threads into the bore of the cylinder, so that in assembly the cylinder may be slid over its piston 34 and coupled to the end fittings. Each of the cylinders 20 and 30 are of the same bore, and the piston 34 located in the operating cylinder 30 is adapted to be forced in one direction by hydraulic pressure exerted thereupon by the piston 22 and to be drawn in the reverse direction by a flexible cable 36 secured to both pistons 22 and 34 and lying in the conduit 26.

The master cylinder, as shown, is provided with a reservoir 40 which contains therein a plunger 42 pressed downwardly by a compression spring 44, the plunger on its under face carrying a cup washer 46 suitably held in place by a light spring 48. The lower part of the reservoir 40 generally indicated as at 50 below the plunger is in effect a pressure chamber due to the loading of the compression spring 44 and therefore serves to maintain the entire system under pressure. A port 52 between the pressure chamber and cylinder is suitably arranged to admit fluid to the cylinder behind the forward piston head 54 and in front of the rear piston head 56 of the piston 22 and the stem 58 connecting the piston heads 54 and 56 is suitably shouldered as at 60 to carry an annular cup washer 62.

Provided in front of the piston 54 is a cup washer 64 adapted to prevent leakage rearwardly past the piston 54 but on the other hand permits the flow of liquid from the rear of piston 54 through the apertures 66 therein and past the washer 64 whenever the pressures upon the rear of the front piston head exceeds the pressure in front thereof. The cup washer 64 may be held in place against the piston by the pressure of a light spring 67 placed between the piston and washer and the cylinder end, as shown.

In order to secure the cable 36 to the piston 22, the stem 58 may extend beyond the piston 54 and be provided with a recess 68 adapted to receive an enlarged end portion or knob 69 on the cable 36. An apertured plug 70 threaded on the cable and screw threadedly engaging the mouth of the recess 68 preferably tightly engages the enlarged end portion or knob 69 thereby securing the cable to the piston.

The other end of the cable may be adjustably secured to the operating cylinder piston by means of an extension 80 upon the piston 34, said extension having a tapered thread 82 on the outside thereof and having a central bore 84 together with a plurality of radial and longitudinal slits 86 extending between the bore and the threaded portion thereby forming a plurality of segments. It will be readily seen that with this construction, the cable 36 may be inserted into the central bore 84, and a nut 88 having a tapered thread, corresponding to the thread 82 on the extension 80 may be screwed tight thereon, squeezing the segmental parts of the extension into tight engagement with the cable. With this structure, assembly may be completed at the operating cylinder end by first securing the cable 36 to the piston 34 and subsequently sliding the cylinder 30 over the piston and securing it to the end fitting 33.

A suitable cup washer 90 is carried on the face of the piston and may be held in place by a light tension spring 92. Upon the upper side of the cylinder 30 is provided a port 94 fitted with a bleed valve 96, so that air or gases collecting in the cylinder may from time to time be allowed to escape.

As best shown in Figure 2, the operating cylinder and piston may be arranged to actuate the elevators of an airplane and for this purpose the piston 34 may be connected through a suitable link 98 to a crank 100 fixed to a cross shaft 102 in turn carrying the elevators 103 and 104.

Since the system described is maintained under pressure, the cable 36 is maintained in a tensioned condition thereby preventing any possibility of lost motion between the master cylinder and operating cylinder. Due to expansion of the liquid as during temperature changes, excessive pressures, tending to unduly stress the tension cable or stretch the conduit, may build up in the system, and in order to relieve the same, a safety valve located on the master cylinder is provided comprising a port 106, valve seat 108 and a spring pressed valve disc 110 all of which are adapted to relieve the excess pressure and permit flow of fluid from the master cylinder and conduit system into the pressure reservoir 50, through the port 112. The safety valve is preferably adjusted so as to function only at a pressure above any normal pressure attained during the usual operation of the system.

Referring to Figure 3 there is shown, as a carburetor throttle valve control, a similar system adapted for operating with the hydraulic fluid under atmospheric pressure. The master cylinder generally indicated as at 120 comprises a cylinder bore 122, and a reservoir 124 located on the upper side of the cylinder, together with suitable ports 126 and 128 leading therebetween. Within the cylinder is a piston 130 adapted to be actuated by the hand lever 132 and link 134, said cylinder having spaced cylinder heads, a forward head 136 and a rearward head 138. The rearward cylinder head 138 carries an annular packing or washer 140 to prevent leakage therepast, and the end of the cylinder is protected against accumulation of dirt and foreign matter by a flexible rubber cone 142 secured at one end to the outside of the cylinder wall and at its other end in an annular groove 144 in the link 134.

The forward piston head 136 is provided with a plurality of apertures 146 and on its forward face is fitted with a cup washer 148 adapted to permit flow of hydraulic liquid through the piston head apertures and past the cup but to effectively seal the forward piston against reverse flow, the said cup washer 148 being carried in an annular groove 150 upon a central extension 152 on the piston 130.

In order to secure a cable 154 to the piston 130, which cable extends through the hydraulic conduit 156, the extension 152 is axially bored as at 158, and a knob or enlarged portion 160 on the end of the cable is inserted in the bore and held therein by an apertured plug 162 threaded on the cable and screw threadedly engaging the mouth of the bore 158.

The operating cylinder which has a bore 170 of the same diameter as the master cylinder is provided with a piston 172 which is adapted, as shown, to actuate the throttle valve 174 of the carburetor 176 through the link 178. The open end of the cylinder into which the link 178 extends may be closed against the entrance of foreign matter by the annular cup rubber washer 180 which engages the link 178 and fits over the open end of the cylinder, and seats in an annular groove 182. The driving face of the piston 172 is fitted with a cup washer 184 carried in an annular groove 186 on a central extension 188, similar to the extension 152 on the master piston. The operating end of the cable 154 may be fitted with a knob or enlarged portion 190 and be set in an axial bore 192 in the extension 188 and held therein by a plug 191 threaded on the cable and screw threadedly engaging the mouth of the bore.

To keep the cable taut and thereby prevent lost motion, each piston is acted upon by a light spring, and as shown in the master cylinder comprises a spring 194 acting between the cylinder end closing fitting 196 and a washer 198, resting against a shoulder 200 on the piston extension 152. As shown in the operating cylinder, a spring 202, acts between the cylinder end closing fitting 204 and a washer 206 similarly carried on a shoulder 208 on the extension 188.

A bleed valve 210 is provided in the operating cylinder to permit bleeding of the system, and since both pistons are coupled together, thereby preventing the master cylinder from acting as a pump to bleed the system, a fitting 212 is placed on the reservoir 124, so that a suitable hand pump or other means may be applied to the reservoir to place the same under pressure. Since due to the elasticity of the conduits, cup washers, etc., there may be a slight tendency for the cable to buckle, and to prevent such action the bore 158 in the master piston is provided with a length greater than that required to clamp the enlarged cable end tightly therein, so that there will be provision for a limited amount of lost motion.

Since after the master piston has moved past the port 128 between the reservoir and cylinder, there is no escape for the hydraulic fluid and since during use of this system, the pistons are likely to remain in such position for great lengths of time, during which expansion and contraction of the liquid may take place, a ball safety valve 214 is provided to relieve any excess pressure which may develop, said safety valve comprising a ball 216 resting on a valve seat 218, and urged thereagainst by a spring 220 compressed between an apertured plug 222 and the ball 216.

As will be noted, the end fittings 196 and 204, to which the conduit 156 is attached are fitted into the cylinder in such a manner that the pistons of the system may be inserted into their respective cylinders after assembly of the conduit, cable and pistons, thereby facilitating such assembly since access to the threaded cable securing plugs 162 and 191 is free and open.

An adaptation of the novel hydraulic-mechanical control to a standard automotive vehicle gear shift is illustrated in Figures 4, 5 and 6. As shown, a manual gear shift lever 230 swivelly supported by a spherical bearing 232 in a casing 234, is adapted to selectively actuate a pair of hydraulic mechanical controls generally indicated as at 236 and 238.

To the casing 234 is secured a pair of duplicate master cylinders arranged side by side, only one of which need be illustrated as at 242, and also a reservoir 244 common to both cylinders located thereabove and connected thereto through ports 246 and 248 arranged to enter the cylinders at points fore and aft of their respective positions when in their rearward positions. Each of the pistons as shown comprises a piston head portion 250 and a hollow shank or sleeve portion 252 extending back to a position adjacent the manual shift lever 230. The rear end of the shank is enlarged slightly at 254 and provided with a recess 256 into which the round disc end portion 258 of the shift lever 230 may lie at such times as the piston is to be actuated. A cover plate 260 secured to the casing 234 is provided with a central partition 262 having a central opening 263 of sufficient depth and width to permit the lower round end portion 258 of the gear shift lever to be moved from one side of the partition to the other, and provide a neutral position where it may rest. Thus the lever may be moved transversely into the recess 256 (or 256' see Fig. 5) and thereafter longitudinally, providing the customary "H" movement of the standard gear shift.

To adjust the cable length at the master cylinder end, the cable 264 is secured to a slidable core 265 which passes through the hollow bore in the piston 250 and its hollow shank or sleeve 252, and extends beyond the end of the shank where a nut 266 threaded on the core 265 is adapted to adjust the relative position of the core and piston. A cup washer 268 is adapted to prevent leakage past the piston either along the core or the cylinder, and complementary shoulders 270 and 272 on the core and inside of the sleeve 252 are adapted to limit the amount of adjustment.

Each of the operating cylinders 280 and 282 are of the same bore as the master cylinders and are arranged side by side as shown in Figure 6. Referring to Figure 4, the cylinders will be seen to be integral with the cover over the transmission gearing, which cover carries the shifter forks. The cylinder 280 is preferably arranged coaxial with a rod guide 284, and the piston 286 is provided with an end shank or rod 288 bearing in the guide and carrying a shifter fork 290. A spring ball lock 285 is adapted to hold the shank or rod in the various neutral and "in gear" positions. Movement of the shifter fork 290 shifts the internally splined annulus 292 so as to couple the externally splined member 294, which is splined on the driven shaft 295, with the externally splined member 296 on the driving shaft 297 for direct drive or with the spline 298 on the intermediate gear 300. As is well understood in the art, movement of the annulus 292 tends to carry with it the splined member 294 whose conical friction clutch surfaces 302 or 304 are first adapted to engage the complementary conical clutch surfaces 306 or 308 on the gear 300 or member 296 respectively, so that shifting of the gears may be expedited by first bringing the members to proper rotation speeds frictionally. In a like manner shifter fork 301 is actuated by the cylinder and piston 282, and slides the gear 303 on the splined driven shaft 295, so as to engage, in the usual manner the forward and reverse gears.

The cable 264 at the operating piston end is secured to a threaded core member 310 which is, in turn, threaded into a bore 312 in the end of the piston together with a resilient spring lock 314 adapted to resiliently seat in longitudinally extending key slots 316 in the piston and in the core as clearly shown in Figure 18. The usual cup washer 320 is secured to the end of the piston in any suitable manner, and bleed valves 322 and 324 are provided (in the end plate 325) to permit the escape of elastic fluids which may become trapped in the cylinders.

As shown, the casing 234 and master cylinders and reservoir may be conveniently secured as a unit to an instrument dash 240 and a forward dash 241 or in any other manner as may be desired.

In the arrangement shown, the movement of the lever 230 is such that when operating in high gear, the master piston is at the rear of its stroke and the corresponding master cylinder is connected to the reservoir, so that no difficulty results from expansion of the fluid during normal high gear operation of the vehicle.

In Figure 7 is illustrated an adaptation of the system to the steering gear of an automotive vehicle, the advantages derived from the use of such an arrangement being particularly, freedom of the steering linkage from the effects of movement of the axle and wheels relative to the vehicle frame. As shown, the steering wheel 350 which is pivotally mounted on the steering column 352 carries a square or otherwise splined shaft 354 adapted to slidably engage a complementary square recessed or splined hollow shaft 356 which is keyed and secured to an externally threaded member 358. A hydraulic cylinder 360 extended at its upper end is provided with an interiorly threaded portion 362 adapted to engage the threaded member 358, so that upon rotation of the steering wheel, axial reciprocation of said member 358 in one direction or the other may take place. A piston 364 located in the cylinder is adapted to reciprocate with the member 358 by reason of a swivel connection 366 therewith. The said piston 364 is provided with forward and rearward piston heads 368 and 370 which are supplied with cup washers 372 and 374, the forward cup being particularly adapted to permit flow of fluid from behind the piston head 368 through apertures 376 therein, whenever the pressure differential fore and aft of the piston head 368 permits.

A reservoir 380 having a spring pressed plunger 382 is connected to the cylinder 360 at a point always between the piston heads 368 and 370, and as a result of the spring 383, acting on the plunger 382 pressure in the system is always maintained. As shown, a cup washer 385 prevents leakage past the plunger and a light spring 387 is provided to hold the cup washer in place. A relief valve 389 may free the system of extraordinary pressures, for example, due to expansion.

A flexible hydraulic conduit 386 is secured to the cylinder end fitting 388, and a flexible tension cable 390 fixed at its end to the piston by means of an enlarged portion 392 securely held behind the apertured screw threaded plug 394 is arranged to reciprocate in said conduit.

An operating cylinder 400 of the same bore as cylinder 360, preferably secured to the axle 402 as shown is connected at one end to the flexible conduit 386 and contains a piston 403 therein secured to the cable 390 by means of an enlarged portion 404 secured in a recess in the piston behind an apertured screw threaded plug 406. A suitable cup washer 408 is secured to the piston, while a bleed valve 410 located at a high point on the piston is provided to permit escape of entrapped elastic fluids.

The piston, at its other end 411, is provided with a connecting rod 412 which in turn is adapted to actuate the steering knuckles 414 and 416 through the interconnecting link 418.

Although in the event of leaks in the hydraulic system, the cable is capable of performing the function of the hydraulic liquid by transmitting compressive forces applied thereto, such action is less efficient due to a buckling action which takes place, but nevertheless provides a suitable safety factor against hydraulic failure. For this purpose it is preferable to stiffen the ends of the cable where it projects out from the conduit into the cylinder, so that buckling at this point will not take place, should the cable be expected to perform this emergency function at any time. The cable may be stiffened by flowing the same in solder or brazing or welding the strands of the same into a stiff solid unit.

A system wherein the factor of safety is doubled is illustrated in Figure 8 and may comprise, as shown, a steering wheel shaft 420 having a worm 422 thereon acting upon a sector gear 424 pivoted on a stub shaft 426. The sector gear is provided with a lever arm 428 reaching down into a master cylinder 427 through a slot 429 and acting on a piston 430 having oppositely disposed heads 432 and 434 at each end. A housing 435 surrounding the sector gear and worm is adapted to be filled with hydraulic liquid which may supply the system under atmospheric pressure if desired and lubricate the worm although the worm and gear may be arranged outside the housing as will be readily understood by those skilled in the art.

Each of the piston heads 432 and 434 are provided with apertures 436 and 438 and cup washers 440 and 442, so that fluid from the reservoir may feed past the pistons when the pressure differential on either side of the piston heads permits such flow. Conduits 444 and 446 and cables 448 and 450 lead from fittings 452 and 454 on opposite ends of the cylinder 427 to an operating cylinder 460 of similar diameter and containing a piston 461 having piston heads 462 and 464 at either end. The conduits are secured to the operating cylinder by suitable fittings 466 and 468, and the cables 448 and 450 are secured at their ends to the master piston 430 and operating piston 461 in any suitable manner as by enlarged portions 470 set in recesses 472 which are closed by apertured plugs 467, through which the cable extends, said plugs screw threadedly engaging the mouth of the recess.

Each of the piston heads are provided with cup washers 474 and 476 to prevent leakage therepast and each end of the cylinder 460 is provided, at a high point, with a suitable bleed valve 478 and 480.

A crank 482 carried on a stub shaft 484 extending through the wall of a housing 486 preferably contiguous with the cylinder, is adapted to be actuated by the movement of the piston 461 by reason of the slot and pin connection 488, and a second crank 490 secured to the shaft 484 is adapted to actuate through a pin and slot connection 492 a steering knuckle connecting link or tie rod 494. There is thus provided a double hydraulic and double cable system having a high degree of safety which readily adapts itself to the transmission of steering wheel turning movements to the dirigible wheels of the vehicle without interference due to movement of the spring suspension between the master and operator elements.

A novel braking system employing the hydraulic mechanical control is illustrated in Figure 9 wherein is shown a master cylinder and reservoir 500 having a cylinder bore 502 connected to the reservoir by the usual ports 504 and 506, except that the forward port 504 may be larger than usual for reasons hereinafter set forth. A piston 508 having longitudinal apertures 509 therethrough and a cup washer 511 on the forward face thereof, is bored at its center to receive a core piece 510, and integrally secured to the rear face of said piston is a sleeve 512 having an internal bore slightly larger than the piston bore, thereby providing a shoulder 514 substantially in the plane of the rear piston face. The core piece 510 has an enlarged end section adapted to reciprocate within the sleeve 512, the enlargement thereof providing a shoulder complementary to and adapted to engage the shoulder 514 in the piston thereby limiting the relative motion between pistons and core in one direction. The cup washer 511 may be held in place by a light tension spring 516, and is adapted to prevent leakage between the piston and core as well as the piston and cylinder, and to assure against leakage between piston and core, an additional washer 518 is inserted within the bore of the piston. As shown, the rear of the cylinder is preferably enlarged in bore, and a cup washer 520, held in place by a spring 522, is provided to prevent leakage past the rear wall of the cylinder.

To the forward end of the master cylinder 502 is a suitable fitting 524 to which is secured a hydraulic conduit 526 through which a tension cable 528 is adapted to reciprocate. The cable is secured at one end to the master piston core member 510 by suitable means comprising an enlarged cable end portion 531 secured behind an apertured screw plug 533. The other end of the cable is secured to a brake operating piston 540 operating within an operating cylinder 542 to which the end of the conduit 526 is secured by a suitable cylinder end fitting 544. The cable is secured to the piston by means 530 similar to the means employed at the master cylinder end, and a cup washer 548 secured in place by a light spring 550 within the cylinder is adapted to make a leak tight joint between piston and cylinder.

The brake operating cylinder 542 is secured perpendicularly to a brake backing plate 545, which is provided with an aperture 546 adapted to be aligned with the cylinder 542. A pair of brake shoes 547 and 549 having webs 550' and 552 are provided at their ends with side thrust rollers 554 and 556 which react upon a channel guide member 558 secured to the backing plate. A pair of oppositely disposed toggles 560 and 562 pivotally secured to the shoe web ends, are provided, one of which is adapted to be actuated by a thrust member 564 extending from the operating piston 540, the thrust member engaging the knee of the toggle 560 and adapted to spread the brake shoes thereby. A tension link 566 secured to the thrust member 564 extends to the knee of the toggle 562, so that with movement of the piston in either direction, the brakes will be applied. A lost motion device, preferably comprising a slot 568 in the tension link 566 is provided so that the two actuating movements may not interfere with each other.

Returning to the master cylinder and particularly the actuating devices for the master piston, it will be observed that the foot pedal 580 pivoted at 582 is adapted when depressed, to drive through the yoke 583 the master piston into its cylinder thereby forcing the operating piston 540 outward thereby spreading the toggle 560, the knee of toggle 562 sliding free in the slot 568 in the tension link. A return spring 584 on the foot pedal 580, returns the master piston to its release position, and carries with it, due to the interengaging shoulders 514, the core member 510, thereby tensioning the cable and returning the operating piston to release position. For an emergency operation, the hand lever 588 may be drawn so as to take up the lost motion connection in a slot 590 provided in the exposed end of the core member 510 and thereafter tension the cable 528 thereby pulling the operating piston toward the master cylinder, and spreading the brake shoes through the action of link 566 and toggle 562. The excess hydraulic fluid in the system during this operation is forced out through the enlarged port 504 between the master cylinder and reservoir into the reservoir. During this latter operation, the knee of toggle 560 leaves the thrust face 565 against which it ordinarily abuts and offers no interference to the hand actuation of the brake.

In Figure 10, a modified form of master cylinder is shown, similar to the master cylinder of Figure 9, but adapted to actuate two brakes of the type shown in Figure 9. The cross-sectional cylinder area in this case is substantially double the cross-sectional area of each of the operating cylinders (see also Figures 16 and 17). The modification comprises a cylinder 602 having a piston 604 through which a shouldered core member 606 is arranged as in Figure 9. The core member at its end carries a bracket 608 to which two tension cables 610 and 612 are secured which pass through two aligned conduits 614 and 616 fastened to the cylinder end fitting 618 and extending to operating cylinders of brakes similar to the one shown in Figure 9.

Obviously the cylinder of Figure 10 may be increased in area to supply four cables and conduits, or if desired may be increased in cross-sectional area for several additional hydraulic conduits without cables for a four wheel hydraulic brake system with two wheel mechanical brake system, as illustrated in Figures 16 and 17.

Figure 11 is illustrative of the manner in which a bellows may be adapted to the various structures herein described. As shown the bellows 630 is provided at one end with an out-turned flange 632 adapted to be clamped between the cylinder end fitting 634 and cylinder 636. At the other end is an in-turned flange 638 adapted to be clamped against a shoulder 640 on a piston 642 by a cap nut 643. The cap nut may as shown be threaded on a tension cable 644 and secure an enlarged end thereof in a recess 646 in the piston end. Both master and operating cylinders would be substantially alike each being provided with a valve 647 in the cylinder end fitting through which hydraulic liquid is injected in one cylinder of the system, and from which hydraulic liquid may be permitted to bleed from another cylinder.

Various forms of cables and conduits may be employed as desired. Plain flexible tubing with a cable of small diameter arranged therein so as not to obstruct flow of hydraulic liquid as shown in the various figures may be found desirable, for the hydraulic fluid lubricates the cable bearing on the conduit, and substantially eliminates friction and wear as a result. It will be understood however, that the tubing must be of such construction as to withstand any reaction compressive stresses resulting from the tensioning of the cable.

Various other forms as shown in Figures 12, 13 and 14 may also be employed as may be found desirable. As shown in Figure 12, an outer shell in the form of a flexible tube 650 may be provided made of tough rubber, copper or other suitable materials, and lined inside with a wire helix 652 which is adapted to form a bearing for the flexible cable 654. In Figure 13, is shown a flexible tube constructed of a pair of rubber composition layers 660 and 662 separated by a thin resilient flexible metallic layer 664 which may be of spirally wrapped or woven thin strip material, or solid, it being borne in mind that the illustrations are greatly exaggerated and that a solid tube of small diameter affords some flexibility. Flanged disc members 666 are spaced at intervals within the conduit to form a bearing for the cable 668 and prevent its wearing the conduit wall. In Figure 14, the tension cable 670 is enclosed in a metallic spirally wound sheath 672 similar to a "Bowden" cable and conduit, and the whole is placed within the hydraulic conduit, which may be constructed from a spiral wrap of metallic wire 674 covered with a sheath 676 of rubber or any other suitable flexible material, metal not being excluded, where limited flexibility only is desired.

Though several embodiments, modifications, and applications of the invention have been illustrated and described, it is to be understood that the invention is not limited thereto but may be adapted to or embodied in various mechanical and hydraulic forms or combinations thereof. As an example the mechanical actuating means or cable of Figure 9 may be adapted or modified to operate through the conduit independent of the movement of the pistons at either end by employing axially slidable core pieces in both master and operator pistons as illustrated in Fig. 15. As such changes in construction and arrangement of the parts may be made without departing from the spirit of the invention, as will be apparent to those skilled in the art, reference will be had to the appended claims for a definition of the limits of the invention.

What is claimed is:

1. A hydraulic control system having a conduit, a cylinder connected to the conduit, hydraulic control liquid therein, a flexible control cable lying in said conduit and adapted to slidably move therein, a piston in the cylinder and a slidable member longitudinally extending through said piston and connected to said cable.

2. In a gear shifting control, a control lever, a master cylinder having a master piston actuated by said control lever, an operating cylinder having an operating piston therein, a flexible conduit connecting said master cylinder to said operating cylinder, hydraulic liquid in said conduit, a gear shifter actuated by said operating piston and a tension member connected through the pistons to the control lever and to the gear shifter.

3. In a hydraulic brake system, a master cylinder, a piston therefor, an operating cylinder, a piston therefor, a conduit connecting said cylinders, a brake adjacent said operating cylinder having actuating means adapted for operation to apply the brake by movement of said piston in one direction, a second actuating means adapted to apply the brake upon movement of the operating piston in the reverse direction and tension means lying in said conduit and secured to said operating piston at one end, and means independent of the master piston for actuating said tension means to apply the brake by moving said operating piston in said reverse direction.

4. In a brake system, hydraulic means for applying a brake including a hydraulic conduit, a separate brake applying means, a flexible tension element lying in said conduit adapted to actuate said separate brake applying means, and control means for tensioning said element.

5. In a brake system, a master cylinder and piston, operating cylinders and pistons, a plurality of conduits secured to the end of the master cylinder and leading to the brake operating cylinders, hydraulic fluid filling said cylinders and conduits, a member slidable through the master piston, and cables in said conduits interconnecting the slidable member extending through the master piston and connected to one of the operating pistons, said operating cylinders having a combined cross-sectional area substantially equal to the cross-sectional area of said master cylinder.

6. A brake comprising friction means, two actuating means therefor, hydraulic means including a conduit for hydraulic fluid for actuating one of said actuating means, and mechanical means including a tension element in the conduit for actuating the other of said actuating means, said hydraulic means and said mechanical means being operable independent of each other.

7. A brake comprising a brake drum, a backing plate, a pair of brake shoes within said drum, a movable element between said shoes, means for pulling said element, means for pushing said element, and means for converting movement of said element in either direction into force for spreading said shoes.

8. A brake comprising a drum, a backing plate, a pair of shoes in said drum, a hydraulic cylinder to the outside of said backing plate having its axis substantially parallel to the axis of rotation of said drum, a piston in said cylinder, a cable extending into said cylinder substantially in the axis of said cylinder, means for converting a pull on said cable into force for spreading said shoes, and means for converting a push on said piston into means for spreading said shoes.

HENRY H. KERR, Jr.